July 22, 1969 W. E. SHOEMAKER ET AL 3,457,493
MULTIPLE CONSTANT CURRENT SUPPLY
Filed Jan. 25, 1966 2 Sheets-Sheet 1

INVENTORS
WILLIAM E. SHOEMAKER
BARRET B. WEEKES
BY
ATTORNEY

INVENTORS
WILLIAM E. SHOEMAKER
BARRET B. WEEKES
BY
ATTORNEY

United States Patent Office 3,457,493
Patented July 22, 1969

---

3,457,493
MULTIPLE CONSTANT CURRENT SUPPLY
William E. Shoemaker, Fullerton, and Barret B. Weekes, Newport Beach, Calif., assignors to Beckman Instruments, Inc., a corporation of California
Filed Jan. 25, 1966, Ser. No. 522,868
Int. Cl. G05f 1/40, 1/52; H02j 1/04
U.S. Cl. 323—4
5 Claims

ABSTRACT OF THE DISCLOSURE

A multiple constant current supply for producing a plurality of currents having predetermined amplitude ratios including a plurality of differentially connected transistor pairs wherein each pair has a Darlington emitter-follower feedback circuit connected between the collector and base electrodes of at least one transistor forming the pair. The constant currents are used with variable resistance transducers such as strain gauges, potentiometers and thermistors. Bridge offset and sensitivity errors of remotely located transduced elements are reduced by including the current supplies in the transducer network.

---

This invention relates to multicurrent transducer signal conditioning employing two or three constant current sources and, more particularly, to preferred embodiments thereof employing remotely located transducers.

In the prior art, transducer conditioning of variable resistance transducers such as strain gauges, potentiometers and thermistors, is usually performed with bridge completion resistors, bridge balance potentiometers, shunt calibration resistors and either single voltage or single current excitation. Both the single voltage and single current transducer conditioners involve significant bridge offset and sensitivity errors, attributable to such things as cable conductor resistance between a transducer conditioner and a remote transducer and its variation with temperature, especially when the transducer cables are thousands of feet long or subject to severe ambient temperature variations.

For one or two remote arms of a bridge the offset and sensitivity errors are the worst offenders. For four remote arms with constant voltage excitation the offset error is not significant, but a significant bridge sensitivity error is often caused by the cable resistance unless remote voltage sensing leads are used, while with single constant current excitation the bridge offset and sensitivity errors caused by the cable resistance are not significant. It is for this reason that a single constant current transducer conditioner is often used when all four arms of the bridge can be placed in the same location. In many instances, however, only one or two active elements can be placed at the remote test location, and the three or two bridge completion resistors must be located hundreds or thousands of feet away. In this event, the cable conductors become a part of the bridge and neither constant voltage conditioning with remote sensing nor single constant current conditioning can suppress temperature dependent offset and sensitivity errors.

These disadvantages and concomitant limitations of single constant voltage or single constant current transducer conditioners may be largely overcome by employing a multicurrent transducer signal conditioner for supplying appropriate excitation to the transducer network monitoring the variables of interest. For optimum performance such a system requires a highly stable and selectively adjustable constant current supply capable of providing a plurality of currents the magnitudes of which are at predetermined ratios.

In brief the present invention contemplates a multiple constant current supply for providing a plurality of constant currents having predetermined amplitude ratios which current supply exhibits substantial stability over a relatively long period of time. To this end there is provided a multiple constant current supply including first and second means for generating first and second constant currents each means of which is characterized by a relatively large output impedance and is formed of a pair of differentially connected tarnsistors having their emitters connected through a first resistor to a first reference potential and their collectors each connected in feedback relationship to their bases by way of first and second Darlington emitter-follower circuits. The feedback circuit includes at least a portion of an emitter resistor located in each of the Darlington circuits connected in the base circuit of one of the two tarnsistors forming the differential pair whereinat least one of the resistor portions is variable to thereby selectively adjust the ratio of the currents at the output terminals. The current supply also includes a third means having a relatively high output impedance for generating a third constant current wherein the third means comprises a differentially connected transistor pair wherein one of the transistors has its base electrode connected to the emitter of the aforementioned first Darlington circuit and the other of the transistors has its base connected to a reference potential and a third Darlington emitter-follower feedback circuit connected between its collector and base electrodes having an adjustable resistance connected in its emitter circuit to selectively vary the magnitude of the third constant current.

The novel features which are believed to be characteristic of the invention are set forth with particularity in the appended claims. The invention and further objects and advantages thereof can best be understood by reference to the following descriptions and accompanying drawings in which:

Figure 1:
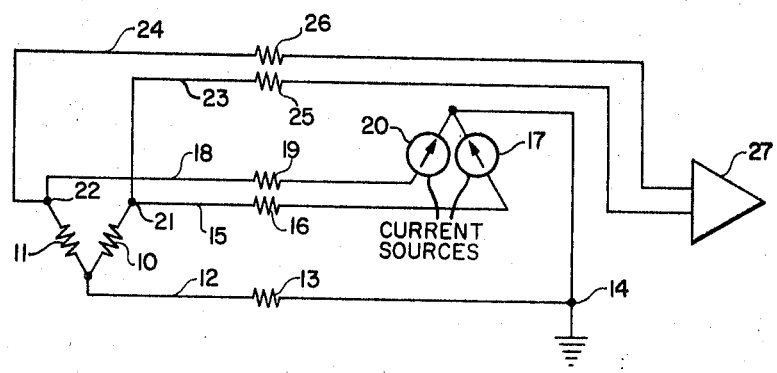
FIG. 1 is a schematic diagram of one embodiment of the invention employing multicurrent signal conditioning of two resistance transducer elements remotely located, one or both of which may be active.

Turning now to the drawings, FIG. 1 illustrates an embodiment of the invention in which two resistance transducer elements 10 and 11 are remotely located. Each of the elements 10 or 11 can contain several resistances or can be single resistors. Either or both can be active. One end of each element 10 and 11 are connected together through a long lead 12, having a lead resistance shown as a lumped resistor 13, to a common point 14, which may be grounded. The other end of the element 10 is connected through a long lead 15, illustrated as having a lumped resistance 16, to one side of a constant current source 17, the other side of which is connected to common point 14. The other end of transducer element 11 is connected through a long lead 18, shown as having a lumped resistance 19, to one side of a constant current source 20, the other side of which is connected to common point 14 in the same polarity as source 17. A bridge is formed having the elements 10 and 11 as two branches and the constant current sources 17 and 20, together with leads 15 and 18, respectively, as the other two branches, with the constant current sources taking the place of the usual completion resistors. Two bridge output terminals 21 and 22, located at the points of connection of elements 10 and 11, with leads 15 and 18, respectively, are connected through long leads 23 and 24, respectively, to the input terminals of a differential amplifier 27. The amplifier 27, current sources 17 and 20 and common point 14 are located adjacent to each other.

The input signal to the amplifier 27, for constant gauge factor elements and constant currents, will be $$e_a = I_1 R'_{T1} \epsilon^{K_1 S_1} - I_2 R'_{T2} \epsilon^{K_2 S_2} \qquad (1)$$

where $K_1$ is the gauge factor of the element 10, $K_2$ is the gauge factor of the element 11, $S_1$ is the stimulus applied to transducer 10. $S_2$ is the stimulus supplied to transducer 11, $R'_{T1}$ is the value of the impedance of transducer 10 when $S_1$ is zero, $R'_{T2}$ is the value of the resistance of the transducer 11 when $S_2$ is zero, $I_1$ is the current in source 17 and $I_2$ is the current in source 20. The requirement that the input signal to the amplifier 27 be equal to zero when the stimuli $S_1$ and $S_2$ are equal to zero, is met by adjusting the ratio of the two currents so that $$\frac{I_1}{I_2} = \frac{R'_{T2}}{R'_{T1}} \qquad (2)$$

When this adjustment has been made the input to the amplifier 27, on a small signal basis, is $$e_a = I_1 R'_{T1} K_1 S_1 - I_2 R'_{T2} K_2 S_2 \qquad (3)$$

For the common situation where the two gauge factors are equal, that is, $K_1 = K_2 = K$, and the two stimuli $S_1$ and $S_2$ are equal and opposite, that is $S_1 = -S_2 = S$, Equation 3 simplifies to $$e_a = (I_1 R'_{T1} + I_2 R'_{T2}) KS \qquad (4)$$

Gauges are most often arranged this way for maximum bridge output. For instance, one gauge may be placed on one side of a sheet of metal to be stressed, with the other gauge placed on the opposite side so that when one gauge is in tension, the other is in compression. If the element 11 is inactive, that is $S_2$ always equals zero, Equation 3 becomes $$e_a = I_1 R'_{T1} K_1 S_1 \qquad (5)$$

or if the element 10 is inactive, that is $S_1$ always equals zero, Equation 3 becomes $$e_a = -I_2 R'_{T2} K_2 S_2 \qquad (6)$$

Changes in line resistances 13, 16, 19, 25 and 26, have a negligible effect on the value of the input signal to amplifier 27. Resistances 25 and 26 are not important due to the high input impedance of the amplifier 27, which is typically greater than 20 megohms. The resistors 16 and 19 are not important because of the high output impedances of the current sources 17 and 20, which are typically greater than $10^8/I$ ohms, where $I$ is the transducer current in milliamperes, and will be described hereinafter. The impedance 13 is not important because the common mode voltage appearing across it is adequately rejected by the amplifier 27, which has a typical common mode rejection of greater than 120 db at a gain of 1,000. A typical amplifier which may be used is described in part in copending applications Ser. No. 496,-791, Shoemaker entitled "Direct Coupled Differential Transistor Amplifier With Improved Offset Voltage Temperature Coefficient" and Ser. No. 496,878, Weekes et al. entitled "Direct Coupled Differential Transistor Amplifier With Improved Common Mode Performance" copending herewith and assigned to the assignee of the present invention. Such an amplifier is available from the assignee under its Model No. C–44.

In the prior art employing a constant voltage bridge or a single constant current bridge, where the active elements are located remote from the bridge completion resistors, the resistance of the cable conductors contributes to the offset voltage errors and circuit sensitivity errors. With multicurrent signal conditioning as described above, these errors are practically nonexistent and temperature changes which cause changes in the conductor resistances, involving an important source of error in conventional signal conditioning in which the conductor resistance is in the bridge arm, are insignificant when multicurrent signal conditioning is used.

Large transducer resistance changes can be accommodated with multicurrent transducer conditioning without introducing nonlinearities. This is attributable to the very high output resistance of the current sources which causes insignificant nonlinear loading errors. In constant voltage or single constant current transducer conditioning, bridge completion resistors are typically equal to the transducer resistance at zero applied stimulus and, hence, significant nonlinear loading errors will be generated for large transducer resistance changes. It is for this reason that multicurrent transducer conditioning is ideal for semiconductor gauges, thermistors and resistance temperature detectors where it is required that transducer output voltage be a linear function of transducer resistance.

Another advantage of the multicurrent signal conditioning technique lies in the accuracy and ease of calibration, which is accomplished in a circuit such as FIG. 1 by changing $I_1$ and/or $I_2$ by accurate predetermined percentages. For example, changing $I_1$, the current in constant current source 17, by a precise 1% produces the same change in $e_a$ as a precise 1% change in the resistance of active element 10 would produce. Calibration thus requires only that the gauge factor be known. The actual value of the resistance of elements 10 and 11 does not affect the calibration. In a conventional bridge signal conditioner, calibration is usually accomplished by switching a precise resistance across the active element and requires that both the gauge factor and the resistance of each active element be known. Multicurrent signal conditioning calibration is more accurate because the uncertainty to which the resistance of the active elements is known is not a factor.

Also, assuming equal arm or transducer currents and that the resistances of any passive arms, or completion resistors, are equal to the transducer resistances, the circuit sensitivity of the embodiment illustrated in FIG. 1 is twice as great since, in the method employing bridge completion resistors, the signal is loaded by the completion resistor which does not change. Multicurrent conditioning is also beneficial because of the reduced cable costs involved. For example, in multicurrent conditioning a four-conductor cable, with the shield as the fifth conductor in which A.W.G. No. 22 or larger number gauge, that is, smaller size, can be used as the conductors, is more than adequate with multicurrent transducer conditioning. With conventional conditioning, up to eight conductors are sometimes required in which two of the conductors are usually A.W.G. No. 18 or smaller number gauge, that is, larger size.

Figure 2:
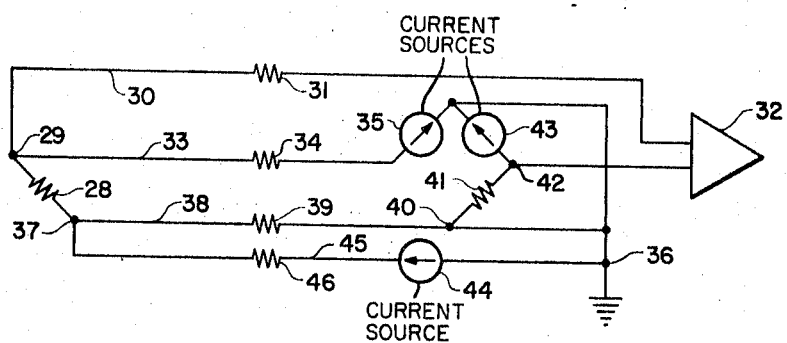
FIG. 2 is a schematic of another embodiment employing a multicurrent signal conditioning of a single resistance element transducer remotely located.

FIG. 2 shows an alternate embodiment of the invention for conditioning a single transducer element remotely located. In this case, the remote sensor element 28 has one terminal 29 connected through a long lead 30, shown as having a lumped resistance 31, to one input of amplifier 32. Terminal 29 is also connected through a long lead 33, shown as having a lumped resistance 34, to one side of a constant current source 35. The other side of constant current source 35 is connected to common terminal 36, which may be connected to ground. The other terminal 37 of the sensor element 28 is connected through a long lead 38, shown as having a lumped resistance 39, to one terminal 40 of a fixed resistance 41. Terminal 40 is also connected to common terminal 36. The other terminal 42 of the resistance 41 is connected to a second input to amplifier 32 and also connected through a constant current source 43 to common terminal 36. In addition, a third constant current source 44 is shown connected to terminal 36 and through long lead 45, shown as having a lumped resistance 46, to terminal 37. Amplifier 32, constant current sources 35, 43 and 44, resistor 41 and common point 36 are located adjacent each other. At terminal 36, $I_1$ and $I_2$ are similarly poled and $I_3$ is oppositely poled.

In this embodiment the current in constant current source 44, $I_3$, is made equal to the current in constant current source 35, $I_1$, both during calibration and during a data run, to the desired degree of accuracy. Applying Kirchoff's law to the junction at terminal 37, it can be seen that only the difference between the currents $I_1$ and $I_3$ exists in the resistance 39. This difference is small enough so that the input voltage to the amplifier 32 is essentially independent of typical values of resistance 39. Performance of the system of FIG. 2 is the same as for the system of FIG. 1, when $I_1$ minus $I_3$ is sufficiently small, and calibration may be carried out in a similar manner making certain that any percentage change in $I_1$ is also made in $I_3$.

Figure 3:
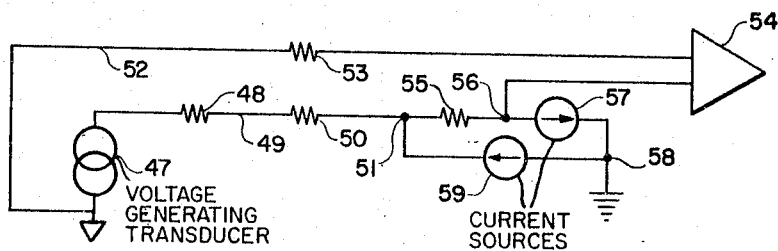
FIG. 3 illustrates a schematic of still another embodiment of a multicurrent signal conditioner for a voltage generating transducer.

FIG. 3 illustrates how currents such as $I_1$ and $I_3$ of FIG. 2 can be used to produce a floating voltage to balance out the zero stimulus offset voltage of a voltage generating transducer 47, illustrated with its internal resistance lumped as resistance 48. One side of transducer 47 is connected through a long lead 49, shown as having a lumped resistance 50, to a terminal 51. The other side of transducer 47 is connected to a common point which has a low impedance to terminal 58 and through a long lead 52, shown as having a lumped resistance 53, to one side of the input of an amplifier 54. A precision resistor 55 is connected from terminal 51 to terminal 56. Terminal 56, in turn, is connected to the other side of the input of amplifier 54. Terminal 56 is also connected through a current source 57 to a common terminal 58, which may be connected to ground. A second current source 59 is connected from terminal 58 to terminal 51. Amplifier 54, resistor 55, sources 57 and 59 and common terminal 58 are adjacent each other, and sources 57 and 59 are oppositely poled at terminal 58.

Where the current through constant current source 57 is designated as $I_1$, and that through constant current source 59 is designated as $I_3$, it can be shown by applying Kirchoff's law to the junction at terminal 51 that only the difference between $I_1$ and $I_3$ exists in the transducer 47. The resistor 55 is made large enough so that the product $(I_1-I_3)(R_L+R_{T3})$ is sufficiently small, where $R_L$ is the value of resistance 50 and $R_{T3}$ the internal resistance 48 of the transducer 47. Thus, the magnitude of the offset voltage applied to the transducer 47 may be varied by varying the resistor 55, so that with zero stimulus supplied to transducer 47, zero input is applied to amplifier 54.

Figure 4:
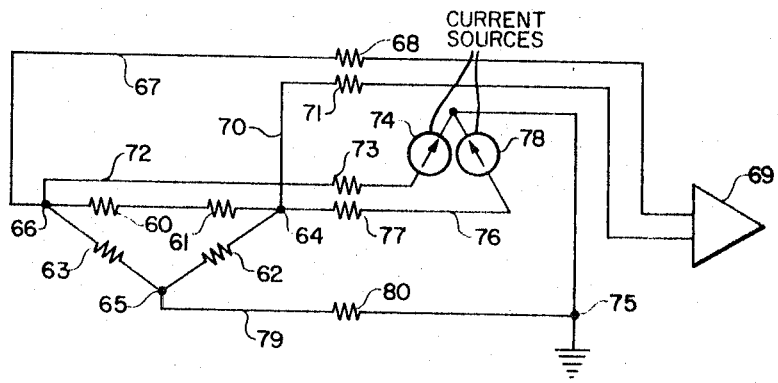
FIG. 4 illustrates a schematic of an embodiment emplying dual current conditioning of a four element bridge, where it is impractical to rewire the elements for physical reasons.

A multicurrent supply, such as may be used in connection with FIGS. 1-3 above, may also be used to condition a four-element bridge such as illustrated in FIG. 4, where it is inconvenient to electrically separate the bridge elements. The bridge, consisting of the four elements 60, 61, 62 and 63 is connected by using the three terminals 64, 65 and 66 between the elements 61 and 62, 62 and 63, and 63 and 60, respectively. Terminal 66 is connected through a long lead 67, shown as having a lumped resistance 68, to one side of the input of amplifier 69. Terminal 64 is connected through a long lead 70, shown as having a lumped resistance 71, to the other side of the input of amplifier 69. Terminal 66 is also connected through a long lead 72, shown as having a lumped resistance 73, to one side of a current source 74, the other side of which is connected to common terminal 75, which may be connected to ground. Terminal 64 is connected through a long lead 76, shown as having a lumped resistance 77, to one terminal of a constant current source 78, the other terminal of which is connected to common terminal 75 in the same polarity as source 74. A long lead 79, shown as having a lumped resistance 80, is connected between terminals 65 and 75. Sources 74 and 78, amplifier 69 and terminal 75 are adjacent.

In this embodiment, the common mode voltage appearing across impedance 80 is adequately rejected by the amplifier 69, which has a typical common mode rejection of greater than 120 db at a gain of 1,000, as previously stated. The constant current sources 74 and 78 again have output resistances greater than $10^8/I$ ohms in which I is the transducer current in milliamps, selectable from 1 to 50. These are close to ideal current generators when compared to transducer resistances in the range of zero to 10 kilohms and typical cable conductor resistances of zero to 100 ohms. Hence, again the cable conductor resistances 73 and 77, shown to be in series with the current sources 74 and 78 respectively, have a negligible effect on the value of the input signal to amplifier 69, and the cable conductor impedances 68 and 71, in series with the amplifier 69 input, are not important due to the amplifier's high input resistance.

With four active arms, the circuit illustrated in FIG. 4 has only half the sensitivity of the corresponding prior art circuit employing constant voltage or single constant current transducer conditioning, again assuming equal arm or transducer currents and that any bridge completion resistances or passive arms are equal to the transducer resistances or active arms. However, the effects of variations in the resistance of the long leads associated with the remote transducers, are overcome and the embodiment is shown to illustrate the flexibility of the multicurrent approach.

As used throughout this specification, the terms "remotely located," "remote," or "long leads" refer to locations of the arms of the various networks such as 10 or 11 of FIG. 1, 28 of FIG. 2, 47 of FIG. 3, and 60, 61, 62 and 63 of FIG. 4, at a distance from their associated amplifier and constant current sources, such that their connection thereto requires the use of long leads such as 12, 15, 18, 23 and 24 of FIG. 1 having appreciable lead resistances so as to affect the measuring circuit. The term "adjacent" is used to define the positioning of elements such as current sources 35 and 43, resistor 41 and amplifier 32 in FIG. 2, which may be interconnected with relatively short leads not having appreciable impedance and not subject to significant changes due to temperature changes.

Figure 5:
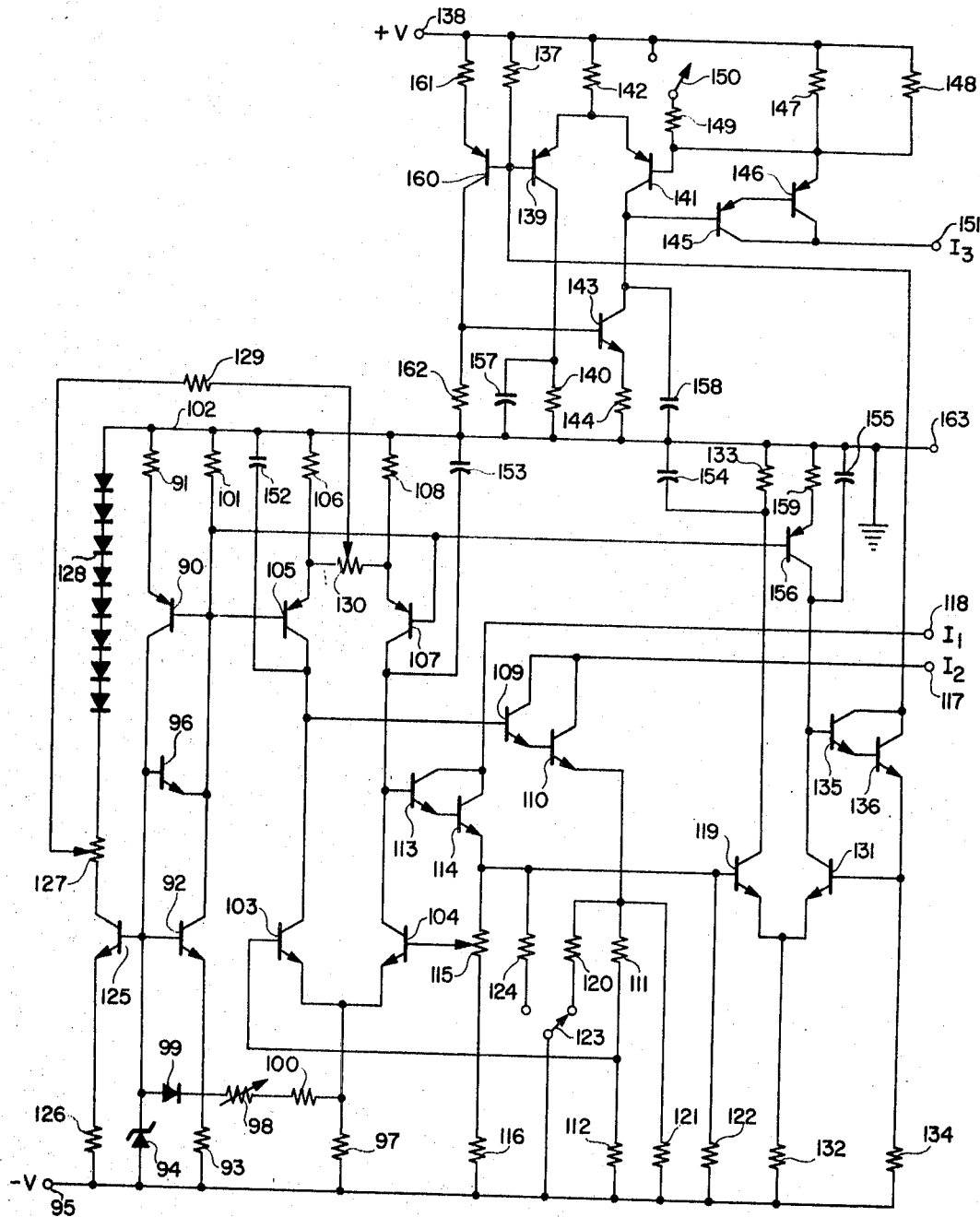
FIG. 5 is a circuit diagram of a particular tri-current supply which may be used to generate the currents employed in carrying out the invention.

Another aspect of the invention is the provision of a tri-current supply capable of producing the constant currents required for multicurrent conditioning in the proper ratios and with the desired calibration variations, in accordance with the foregoing. Such a supply is illustrated in FIG. 5, which will produce $I_1$, $I_2$ and $I_3$ of the required range and accuracy for typical transducers. Transistor 90 and resistor 91 comprise a current source, with transistor 92 and resistor 93 acting as a current sink. The collector current of transistor 92 is controlled by resistor 93 and the voltage across a Zener diode 94, which is connected from the base of transistor 92 to the minus voltage supply line 95. Polarities are for the type of devices illustrated but could obviously be reversed for opposite polarity devices. The collector current of transistor 92 and resistor 91 likewise control the collector current of transistor 90, most of which exists in Zener diode 94. The current in Zener diode 94 is therefore little affected by changes in the minus voltage line 95. The emitter-base junction of a transistor 96 is connected from the collector of transistor 92 to the collector of the transistor 90 and breaks down emitter-to-base when voltage is first applied, helping to establish operation, but is not effective thereafter.

A portion of the voltage across Zener diode 94 appears across resistor 97. This can be varied by varying variable resistor 98, which is connected in series with a diode 99 and a fixed resistor 100 from the cathode of Zener diode 94 to one terminal of resistor 97, the other terminal of resistor 97 being connected to the minus voltage line 95. Diode 99 is used to give first order cancellation of the base-emitter voltage temperature coefficient of transistors 103 and 104 to maintain the absolute values of $I_1$ and $I_2$ more nearly constant. The collector of transistor 92 is connected through a resistor 101 to a ground line 102, as is the emitter of transistor 90 through resistor 91. The cathode of Zener diode 94 is also connected to the collector of transistor 90.

Transistors 103 and 104 constitute a matched differentially connected pair with base-emitter voltages matched to within five millivolts, for example. The emitters of transistors 103 and 104 are connected to the junction of resistors 97 and 100. The collector current of transistor 103 is supplied by a current source comprised of a transistor 105 with a resistor 106 connected from its emitter to ground line 102, the collectors of opposite polarity transistors 103 and 105 being interconnected. The collector current of transistor 104 is supplied by a current source comprising transistor 107 and resistor 108. Resistor 108 is connected from the emitter of transistor 107 to line 102. The collectors of transistors 104 and 107 are interconnected. The collector currents of transistors 103 and 104 are thereby practically independent of variations in the minus voltage line 95, and the collector load impedance of both transistors 103 and 104 is high to obtain maximum voltage gain in both stages. Transistors 105 and 107 are a matched pair, so that a temeprature effect on their base-emitter voltages will produce almost equal eqects on the collector currents of transistors 103 and 104, and the differential base-emitter voltage of transistors 103 and 104 will be only slightly affected.

The collector of transistor 103 is connected to the base of transistor 109, the emitter of transistor 109 being connected to the base of transistor 110. Transistors 109 and 110 have their collectors interconnected, forming a Darlington emitter follower circuit, and the emitter of transistor 110 is connected through series resistors 111 and 112 to the minus voltage line 95. The junction of resistors 111 and 112 is connected in feedback relationship back to the base of transistor 103 to maintain the required voltage at the base. Similarly, the collector of transistor 104 is connected to the base of transistor 113, which has its emitter connected to the base of transistor 114. Again, the collectors of transistors 113 and 114 are interconnected, forming a Darlington emitter follower circuit, and the emitter of transistor 114 is connected through a potentiometer 115 and a series resistor 116 to the minus voltage line 95. The tap on potentiometer 115 is connected in feedback relationship to the base of transistor 104 to maintain the required voltage at the base.

The collectors of transistors 109 and 110 are connected to a terminal 117, and the collectors of transistors 113 and 114 are connected to a terminal 118.

The emitter of transistor 114 is connected to the base of transistor 119. The emitter of transistor 110 is also connected through a precision calibrating resistor 120 to one of the fixed terminals of a two-position switch 123, the movable contact of switch 123 being connected to the minus voltage line 95. The emitter of transistor 110 is also connected through a resistor 121 to the minus voltage line 95. The base of transistor 119 is connected through a resistor 122 to minus voltage line 95. A precision calibrating resistor 124 is connected from the emitter of transistor 114 to the other fixed terminal of switch 123.

The current $I_1$ appears at terminal 118 and the current $I_2$ at terminal 117. The total effect is to maintain the current $I_1$ at such a value that the voltage at the wiper of potentiometer 115, with respect to the minus voltage line 95, is equal to the voltage across resistor 97 plus the base-emitter voltage of transistor 104, and to maintain the current $I_2$ at such a value that the voltage across resistor 112 is equal to the voltage across resistor 97 plus the base-emitter voltage of transistor 103. It can be seen that $I_1$ and $I_2$ will be constant if the voltage across resistor 97 is constant, the base-emitter voltage of transistors 103 and 104 are constant, the base currents of transistors 103, 104, 113, 109 and 119 are constant, and if the resistance of potentiometer 115 and resistors 111, 112, 116, 120, 121, 122 and 124 are constant.

It can also be seen that if the differential base-emitter voltage of transistors 103 and 104 is zero, the ratio of $I_1$ to $I_2$ is not affected by changes in the voltage across resistor 97. In this event, the absolute values of $I_1$ and $I_2$ are affected by changes in voltage across the Zener diode 94 but the ratio of $I_1$ to $I_2$ is not affected. Likewise, the absolute values of $I_1$ and $I_2$ are effected by changes in the absolute values of the base-emitter voltages of transistors 103 and 104, but the ratio $I_1$ to $I_2$ is not affected.

Since transistors 103 and 104 are selected for close base-emitter voltage match, that is, less than 5 millivolts, the ratio of $I_1$ to $I_2$ is essentially dependent only on changes in the differential base-emitter voltage of transistors 103 and 104, the base currents of transistors 103, 104, 113, 109 and 119 and the values of potentiometer 115 and resistors 111, 112, 116, 120, 121, 122 and 124. With current gains of 100 in transistors 113, 114, 109 and 110 which are connected in Darlington common emitter configurations, the base current of transistor 113 is .01 percent of $I_1$ and the base current of transistor 109 is .01 percent of $I_2$. Therefore, a one precent change in current gains of either transistors 113 or 114 produces a one part per million (p.p.m.) change in $I_1$, and a one percent change in current gains of either transistor 109 or 110 produce a one part per million change in $I_2$, if the resulting changes in the collector currents of transistors 103 and 104 are neglected.

The collector current for transistors 103 and 104, which is supplied by transistors 105 and 107, would normally be chosen to be about .5% of $I_1$ and $I_2$, in which case a 1% change in current gains of transistors 109 and 110, for example, would produce a .02% change in collector current of transistor 103, which would produce a 5.2 microvolt change in the base-emitter voltage of transistor 103. This 5.2 microvolt change out of a nominal 6 volts, for example, across resistor 112, produces a change of .87 p.p.m. in the current $I_2$. This .87 p.p.m. change in $I_2$ is in the direction opposite to the one p.p.m. change in $I_2$ described in the preceding paragraph. The net result of a 1% change in current gain of transistors 109 and 110 is a change in $I_2$ of much less than 1 p.p.m. Likewise, the net result of a 1% change in the current gain of transistors 113 or 114 is a change in $I_1$ of much less than 1 p.p.m.

With the collector currents of transistors 103 and 104 being .5% of $I_1$ and $I_2$, as described above, and with transistors 103 and 104 having current gains of 100, a 1% change in either of these current gains produces a .5 p.p.m. change in $I_1$ or $I_2$. A 5 microvolt change in the differential base-emitter voltage of transistors 103 and 104 will produce a .83 p.p.m. change in the $I_1$ to $I_2$ ratio. The collector current of transistor 119, the operation of which will be described later, is normally smaller than the collector currents of transistors 103 and 104 so the effect of a 1% current gain change in transistor 119 is less than 1 p.p.m. change in $I_1$.

Summarizing, the change in the $I_1$ to $I_2$ ratio will be less than 1 p.p.m. for 1% current gain change in transistors 103, 104, 113, 109 or 119, or for a 5 microvolt differential base-emitter voltage change in transistors 103 and 104. These changes in current gains and differential base-emitter voltage are within the limits which can reasonably be expected to exist for 100 hours in high quality silicon transistors at constant temperature.

The changes which can be expected to result from temperature changes are +1% current gain per degree centigrade, and ±20 microvolts differential base-emitter voltage per degree centigrade. The current gain changes, since they occur in both the $I_1$ and $I_2$ circuits, cancel each other except for the amount of imbalance. A ±20 microvolt per degree centigrade differential base-emitter voltage, if it were that large, would produce 3.3 p.p.m. per degree centigrade change in the $I_1$ to $I_2$ ratio, if it were not for a temperature compensation circuit such as will now be described.

The voltage across Zener diode 94 drives a current sink comprised of transistor 125 and resistor 126, the base of transistor 125 being connected to the cathode of Zener diode 94 and the emitter of transistor 125 being connected through resistor 126 to the minus voltage line 95. The collector of transistor 125 is connected through the extremities of a potentiometer 127 and through a diode chain 128, shown as including eight diodes, to the line 102. The resulting current which exists in the diode chain 128 and in potentiometer 127 is essentially independent of variations in the minus voltage line 95. The voltage at the wiper of potentiometer 127 changes approximately at the rate of plus 16 millivolts per degree centigrade because of the eight diodes in diode chain 128, each of which has a forward voltage temperature coefficient of approximately −2 millivolts per degree centigrade.

At room temperature, for example, the wiper on potentiometer 127, which is connected through resistor 129 to the wiper on a potentiometer 130 which has its opposite extremities connected to the emitters of transistors 105 and 107, is adjusted to a setting where the voltage at the wiper of 127 is equal to the voltage at the emitters of transistors 105 and 107. When this is done there is no current in resistor 129, regardless of the position of the wiper on potentiometer 130. The next step is to adjust the $I_1$ to $I_2$ ratio to a value which is easily measured within say 1 p.p.m. This can be done by using a pair of matched precision resistors as loads for $I_1$ and $I_2$, connecting them respectively to terminals 117 and 118 and to terminal 163 on ground line 102 and monitoring the voltage between terminals 117 and 118. Zero volts is a convenience reference point.

Next, the circuit is raised in temperature by, for example, 30 degrees centigrade. The voltage at the wiper of potentiometer 127 changes about 480 millivolts while the voltage at the emitters of transistors 105 and 107 changes by a much smaller amount. The resulting current in resistor 129 divides at the wiper potentiometer 130 to reach the emitter of transistors 105 and 107. The setting of the wiper of potentiometer 130 determines the division of the current. The portion of this current which reaches the emitter of transistor 105 increases the collector current of transistor 103, which increases the base-emitter voltage of transistor 103 and thereby increases $I_2$. An increase of 1% in the collector current of transistor 103, for example, increases the base emitter voltage of transistor 103 by approximately 260 microvolts and thereby decreases the $I_1$ to $I_2$ ratio by approximately 43 p.p.m. The remaining portion of the current in resistor 129 reaches the emitter of transistor 107 and increases the collector current of transistor 104, which increases its base-emitter voltage and thereby increases $I_1$. The wiper of potentiometer 130 is set at the point where the ratio $I_1$ to $I_2$ was the same as it was at room temperature.

This compensates the circuit of FIG. 5 for all effects which would otherwise cause the ratio of $I_1$ to $I_2$ to vary with temperature, including potentiometer 115 and resistors 111, 112, 116, 120, 121, 122 and 124. With quality silicon transistors, where leakage is negligible, all effects are essentially linear with temperature, as is the compensating current in resistor 129. The compensation is therefore adequate over a large temperature range. The circuit is potentially capable of maintaining a $I_1$ to $I_2$ ratio of better than 1 part per million for 100 hours with a temperature coefficient of better than 1 part per million per degree centigrade. This stability is essentially equal to the stability of bridge completion resistors used with conventional signal conditioners, and the temperature coefficient is five to ten times better than the typical resistance ratio temperature coefficient of a pair of matched bridge completion resistors.

The absolute values of $I_1$ and $I_2$ are not nearly so closely controlled as is the $I_1$ to $I_2$ ratio because the absolute value changes produce only a common mode voltage, which is adequately rejected by the typical amplifier such as mentioned in connection with the previous figures, and a change in circuit sensitivity of negligible proportion.

Now that the generation of $I_1$ and $I_2$ have been discussed, the generation of $I_3$ will be described. The important point in the generation of $I_3$ is again not its absolute value but the ratio of $I_1$ to $I_3$. The aim is for the ratio of $I_1$ to $I_3$ to be unity but the requirement is about 10 times as loose as it is for the $I_1$ to $I_2$ ratio. This is because in FIG. 2, for example, the value of impedance 39 is usually less than 0.1 times the impedance of the transducer 28, and in FIG. 3 the impedance 55 may be made large enough so that $(I_1 - I_3)(R_L + R_{T3})$ is sufficiently small.

In FIG. 5 the voltage at the base of transistor 119 is precisely proportional to $I_1$. The voltage at the base of transistor 131, which is differentially conneced with transistor 119, differs from the voltage at the base of transistor 119 only by the differential base-emitter voltage of the two transistors which is typically plus or minus 5 millivolts. The transistors 119 and 131 have their emitters connected together and through a resistor 132 to the negative voltage line 95. The collector of transistor 119 is connected through a resistor 133 to the common line 102, which is grounded. The base of transistor 131 is connected through resistor 134 to the negative voltage line 95 to develop a reference potential. A pair of transistors 135 and 136 are connected in Darlington emitter follower configuration with the base of transistor 135 connected to the collector of transsitor 131, the emitter of 135 connected to the base of 136 and the emitter of 136 connected to the base of 131 in feedback relationship. The collectors of transistors 135 and 136 are connected together and through a resistor 137 to a positive votlage line 138. Because of the large gain of the loop including transistors 131, 135 and 136, the curernt in resistors 134 and 137 is precisely proportional to $I_1$, as is the voltage at the base of transistor 139 which is connected to the collectors of transistors 135 and 136.

The collector of transistor 139 is connected through a resistor 140 to the common line 102 and the emitter of transistor 139 is connected together with the emitter of transistor 141, with which it is differentially connected, through a resistor 142 to the positive voltage line 138. The collector of transistor 141 is connected, in turn, to the collector of the transistor 143, the emitter of which is connected through a resistor 144 to the common line 102.

The voltage at the base of transistor 141 differs from the voltage at the base of transistor 139 only by the differential base-emitter voltage of the transistors, which is typically plus or minus 5 millivolts. The collector of transistor 141 is connected to the base of transistor 145, which is connected in Darlington emitter follower configuration with transistor 146 by connecting the collectors of transistors 145 and 146 together, and the emitter of transistor 145 to the base of transistor 146. The emitter of transistor 146 is connected to the positive voltage line 138, through resistor 147 in parallel with resistor 148. The emitter of transistor 146 is also connected in feedback relationship to the base of transistor 141, and through a calibrating resistor 149 to the moveable contact of a switch 150, which is ganged with switch 123. The fixed terminal of switch 150, corresponding with the contact of switch 123 to which resistor 124 is connected, is connected to the positive voltage line 138. The collectors of transistors 145 and 146 are connected to a terminal 151 at which the current $I_3$ appears.

The gain of the loop, including transistors 141, 145 and 146, assures that $I_3$ will be precisely proportional to the voltage at the base of transistor 141 and therefore precisely proportional to $I_1$. The output points for $I_1$ and $I_3$, the terminals 118 and 151, may be connected together and connected through a resistance to ground. The voltage across this resistance is a direct measurement of the difference between $I_1$ and $I_3$ which should ideally be zero. The resistors 134, 137 or 147 may be trimmed to make this difference sufficiently close to zero.

The differential pair of transistors 139 and 141, and the Darlington circuit including transistors 145 and 146 and the circuitry associated therewith, constitute a high output impedance polarity reversing network for the current from the output of transistors 135 and 136.

Resistors 120, 124 and 149 are precision calibrating resistors. Normally they would be on the order of one hundred times the value of the resistors they shunt for a calibration change of about 1%. When switch 123 and 150 are in their righthand position, resistor 120 shunts resistors 111 and 112 in the $I_2$ circuit. When in the left-hand position, resistor 120 is removed and resistor 149 shunts resistor 147 in the $I_3$ circuit and resistor 124 shunts potentiometer 115 and resistor 116 in the $I_1$ circuit. The modification, due to the shunting in the $I_1$ and $I_3$ circutis, must be in the same ratio as previously mentioned. Thus, a single set of precision resistors for calibration replaces the need to know the exact values of the many transducers which might be used with such a supply.

The resistors 121, 122 and 148 are precision current range resistors, which can be changed to produce a range of absolute values for $I_1$, $I_2$ and $I_3$. The variable resistor 98 produces a small change, typically plus or minus 5%, in the absolute value of $I_1$, $I_2$ and $I_3$. The potentiometer 115 produces a small, typically plus or minus 2%, change in the absolute value of $I_1$ and $I_3$ only and, therefore, changes the $I_1$ to $I_2$ ratio to produce balance, that is, zero transducer output voltage at zero stimulus.

Capacitor 152 is connected from the collector of transistor 105 to the common line 102. Capacitor 153 is connected from the collector of transistor 107 to the common line 102. Capacitor 154 is connected across resistor 133. Capacitor 155 is connected from the collector of transistor 156 to the common line 102. Capacitor 157 is connected across resistor 140 and capacitor 158 is connected from the collector of transistor 143 to the common line 102. These capacitors are included to assure that when the open loop gain of each amplifier equals the required closed loop gain, the phase shift will be well within the limits required for stability.

Transistor 156, with resistor 159 connected from its emitter to common line 102 and its collector connected to the collector of transistor 131, comprises a current source to keep the collector currents of transistors 119 and 131, and therefore their base-emitter voltages, independent of variations in the minus voltage line 95, and to keep the resistance of the collector circuit of transistor 131 large for high gain. The base of transistor 156 is connected to the bases of transistors 90, 105 and 107.

Transistor 143 and resistor 144 comprise a current sink to keep the collector currents of transistors 139 and 141, and therefore their base-emitter voltage, independent of variations in the plus voltage line 138, and to keep the collector resistance of transistor 141 large for high gain.

A transistor 160 has its emitter connected through a resistor 161 to positive voltage line 138 and its collector connected to the base of transistor 143 and through a resistor 162, to the common line 102. The base of transistor 160 is connected to the base of transistor 139 and to the collectors of transistors 135 and 136. Transistor 160 and resistor 161 comprise a current source to produce a voltage across resistor 162, which is independent of variations in the plus voltage line 138. This voltage drives the current sink, comprised of transistor 143 and resistor 144, mentioned above.

Resistor 133 is used for lowering the collector voltage of transistor 119 to attain better symmetry between transistors 119 and 131 for base-emitter voltage temperature tracking. Resistor 140 similarly is for lowering the collector voltage of transistor 139 to attain better symmetry between transistors 139 and 141 for base-emitter voltage temperature tracking.

The circuit of FIG. 5 will provide the currents required by the circuits of FIGS. 1–4, having the required adjustments to vary the currents and adjust them to the desired ratios and the required output impedances to attain the desired result.

What is claimed is:

1. A multiple constant current supply for use in a multicurrent transducer signal conditioning system for conditioning transducers comprising:

first means for generating a first constant current having an output impedance several orders of magnitude higher than the impedance of the transducers to be conditioned;

second means for generating a second constant current having an output impedance several orders of magnitude higher than the impedance of the transducers to be conditioned;

said first and second means including first and second differentially connected transistors having their emitters connected through a first resistor to a first potential and their collectors each connected in feedback relationship through first and second Darlington emitter follower circuits, respectively, to their bases and to output terminals, said Darlington circuits having emitter resistors connected from their final emitter to said first voltage line, said feedback connection including at least a portion of the emitter resistor of each of said Darlington circuits connected back to the base of the one of said two transistors in its respective current circuit, at least one of said portions being adjustable whereby the ratio of the currents at said output terminals may be adjusted;

third means for generating a third constant current having an output impedance several orders of magnitude higher than the impedance of the transducers to be conditioned, including third and fourth differentially connected transistors, said third transistor having its base connected to the emitter of said first Darlington circuit and said fourth transistor having its base connected to a reference potential, a third Darlington circuit connected in feedback relationship from the collector to the base of said fourth differentially connected transistor, the collectors of said third Darlington circuit being connected through a high output impedance polarity reversing network to a third output terminal; and means for adjusting a resistance in the output circuit of said third Darlington circuit to set the current at said third output terminal equal to magnitude to that at said first output terminal.

2. The supply of claim 1 in which an adjustable constant voltage source reference to said first reference potential is connected across said first resistor.

3. The supply of claim 1 in which the collectors of said first and second differentially connected transistors are connected to transistor current sources provided with temperature compensation.

4. The supply of claim 1 in which said emitter resistors and the resistors in the output circuit of said third Darlington circuit can be shunted with precision resistors whereby the currents at the three output terminals can be varied by a fixed accurate percentage for calibration purposes.

5. The supply of claim 1 in which said high output impedance polarity reversing network comprises fifth and sixth differentially connected transistors, the collectors of said third Darlington circuit being connected to the base of said fifth transistor and the base of said sixth transistor being connected to a source of reference potential; a fourth Darlington circuit connected in feedback relationship between the collector and base of said sixth transistor, the collectors of said fourth Darlington circuit being connected to said third output terminal.

References Cited

UNITED STATES PATENTS

| | | | |
|---|---|---|---|
| 3,332,007 | 7/1967 | Livengood et al. | 323—9 |
| 3,351,846 | 11/1967 | Tinsley | 323—1 |
| 3,381,211 | 4/1968 | Prapis et al. | 323—9 |

JOHN F. COUCH, Primary Examiner

A. D. PELLINEN, Assistant Examiner

U.S. Cl. X.R.

73—88.5; 307—24, 33, 55, 60; 323—75; 324—65

PO-1050
(5/69)

UNITED STATES PATENT OFFICE
CERTIFICATE OF CORRECTION

Patent No. 3,457,493     Dated     July 22, 1969

Inventor(s)   William E. Shoemaker and Barret B. Weekes

It is certified that error appears in the above-identified patent and that said Letters Patent are hereby corrected as shown below:

Column 12, line 35, insert --- reference --- before "potential"--;
Column 12, line 63, "to" (first occurrence) should read -- in --.

SIGNED AND
SEALED

DEC 2 - 1969

(SEAL)
Attest:

Edward M. Fletcher, Jr.
Attesting Officer

WILLIAM E. SCHUYLER, JR.
Commissioner of Patents